(12) United States Patent
Beck et al.

(10) Patent No.: US 10,605,337 B2
(45) Date of Patent: Mar. 31, 2020

(54) VEHICLE TRANSMISSION

(71) Applicant: ZF Friedrichshafen AG, Friedrichshafen (DE)

(72) Inventors: Stefan Beck, Eriskirch (DE); Max Bachmann, Friedrichshafen (DE); Martin Brehmer, Tettnang (DE); Anton Fritzer, Markdorf (DE); Suryanto Hendrawan, Constance (DE); Matthias Horn, Tettnang (DE); Johannes Kaltenbach, Friedrichshafen (DE); Raffael Kuberczyk, Ravensburg (DE); Jens Moraw, Friedrichshafen (DE); Gerhard Niederbrucker, Friedrichshafen (DE); Juri Pawlakowitsch, Kressbronn (DE); Martin Rattay, Ravensburg (DE); Matthias Reisch, Ravensburg (DE); Wolfgang Rieger, Friedrichshafen (DE); Thomas Rosemeier, Meckenbeuren (DE); Lara Ruth Turner, Immenstaad (DE); Michael Roske, Friedrichshafen (DE); Viktor Warth, Friedrichshafen (DE); Bernd Unseld, Ravensburg (DE); Michael Wechs, Weißensberg (DE); Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 81 days.

(21) Appl. No.: 15/925,149

(22) Filed: Mar. 19, 2018

(65) Prior Publication Data

US 2018/0266525 A1    Sep. 20, 2018

(30) Foreign Application Priority Data

Mar. 20, 2017 (DE) .................. 10 2017 204 548

(51) Int. Cl.
*F16H 3/72* (2006.01)
*F16H 37/06* (2006.01)
(Continued)

(52) U.S. Cl.
CPC ............. *F16H 3/666* (2013.01); *B60K 6/365* (2013.01); *B60K 6/387* (2013.01); *B60K 6/48* (2013.01);
(Continued)

(58) Field of Classification Search
CPC ......... F16H 2200/201; F16H 2200/202; F16H 2200/2046
See application file for complete search history.

(56) References Cited

U.S. PATENT DOCUMENTS 6,558,287 B2    5/2003  Hayabuchi et al.
6,991,578 B2 *  1/2006  Ziemer ................. F16H 3/66
                                                            475/271
(Continued)

FOREIGN PATENT DOCUMENTS

DE        10115983 A1    10/2002
DE    102015213516 A1     1/2017
(Continued)

OTHER PUBLICATIONS

German Search Report DE102017204548.5, dated Jan. 26, 2018. (12 pages).

*Primary Examiner* — Tisha D Lewis
(74) *Attorney, Agent, or Firm* — Dority & Manning, P.A.

(57) ABSTRACT

A transmission for a motor vehicle wherein the drive shaft (An) is rotationally fixedly connectable by the first shift element (K1) to the first shaft (1) and by the second shift element (K2) to the second shaft (2). The second shaft (2) is rotationally fixedly connectable by the fifth shift element (B2) to the housing (3). The third shaft (4) is rotationally fixedly connected to the third gear set element of the second planetary gear set (RS2) and to the first gear set element of (Continued)

the third planetary gear set and is rotationally fixedly connectable by the sixth shift element (B1) to the housing (3). The second gear set element of the third planetary gear set (RS3) is rotationally fixedly connected to the output shaft (Ab), and the third gear set element of the third planetary gear set (RS3) is rotationally fixedly connected to the second shaft (2).

24 Claims, 9 Drawing Sheets (51) Int. Cl.
| | | |
|---|---|---|
| *F16H 3/62* | (2006.01) | |
| *F16H 3/44* | (2006.01) | |
| *F16H 3/66* | (2006.01) | |
| *F16H 37/08* | (2006.01) | |
| *B60K 6/48* | (2007.10) | |
| *B60K 6/365* | (2007.10) | |
| *B60K 6/387* | (2007.10) | |
| *B60K 6/547* | (2007.10) | |

(52) U.S. Cl.
CPC ............... *B60K 6/547* (2013.01); *F16H 3/66* (2013.01); *F16H 37/0833* (2013.01); *B60K 2006/4825* (2013.01); *B60K 2006/4833* (2013.01); *F16H 2003/442* (2013.01); *F16H 2200/006* (2013.01); *F16H 2200/0086* (2013.01); *F16H 2200/201* (2013.01); *F16H 2200/2046* (2013.01); *F16H 2200/2094* (2013.01); *F16H 2200/2097* (2013.01); *Y02T 10/6221* (2013.01)

(56) References Cited

U.S. PATENT DOCUMENTS

| | | | |
|---|---|---|---|
| 7,018,319 B2 | 3/2006 | Ziemer | |
| 7,878,938 B2* | 2/2011 | Choi | F16H 3/663 |
| | | | 475/275 |
| 8,257,215 B2* | 9/2012 | Borntraeger | B60K 6/365 |
| | | | 475/149 |
| 9,714,692 B2* | 7/2017 | Kim | F16H 3/66 |
| 2012/0172170 A1* | 7/2012 | Wittkopp | F16H 3/666 |
| | | | 475/271 |

FOREIGN PATENT DOCUMENTS

| | | |
|---|---|---|
| DE | 102015223290 A1 | 6/2017 |
| WO | WO 2017/012777 A1 | 1/2017 |

* cited by examiner

| Gear | Engaged Shift Elements | | | | | |
|---|---|---|---|---|---|---|
| | Brake | | Clutch | | | |
| | B1 | B2 | K1 | K2 | K3 | K4 |
| G1 | X | | X | | | |
| G2 | X | | | | X | |
| G3 | X | | | X | | |
| G4 | | | | X | X | |
| G5 | | | X | X | | |
| G6 | | | | X | | X |
| G7 | | | X | | | X |
| G8 | | | | | X | X |
| R1 | | X | X | | | |
| R2 | | X | | | X | |
| ZV | | X | | | | X |

Fig. 9

VEHICLE TRANSMISSION

FIELD OF THE INVENTION

The invention relates generally to a transmission for a motor vehicle, having a drive shaft, an output shaft, a first planetary gear set, a second planetary gear set and a third planetary gear set. The invention also relates to a hybrid transmission having a transmission of said type. The invention also relates to a vehicle having the transmission or the hybrid transmission.

BACKGROUND

The prior art has disclosed a multiplicity of transmissions that are installable in motor vehicles. For example, U.S. Pat. No. 6,558,287 B2 has disclosed a transmission having three planetary gear sets and six shift elements, by which multiple gear ratios are providable.

SUMMARY OF THE INVENTION

Therefore, the object of the invention is to provide an improved transmission which is suitable for front-transverse installation in a motor vehicle and for hybridization.

The object is achieved by a transmission of the type mentioned in the introduction which is distinguished by the drive shaft being rotationally fixedly connectable by a first shift element to a first shaft and by a second shift element to a second shaft. Further, the first planetary gear set has a first gear set element, a second gear set element and a third gear set element, wherein one of the three gear set elements is rotationally fixedly connected to a housing, and another of the three gear set elements is rotationally fixedly connected to the drive shaft, such that the first planetary gear set is configured to provide, at a further one of the three gear set elements, a rotational speed that is increased in relation to the drive shaft. The further one of the three gear set elements is rotationally fixedly connectable by a third shift element to the first shaft and is rotationally fixedly connectable by a fourth shift element to a third shaft, wherein the further one of the gear set elements has a higher rotational speed than the drive shaft. Additionally, a first gear set element of the second planetary gear set is rotationally fixedly connected to the first shaft, a second gear set element of the second planetary gear set is rotationally fixedly connected to a second gear set element of the third planetary gear set, and a third gear set element of the second planetary gear set is rotationally fixedly connected to a first gear set element of the third planetary gear set. Further, the second gear set element of the third planetary gear set is rotationally fixedly connected to the output shaft, and a third gear set element of the third planetary gear set is rotationally fixedly connected to the second shaft. Further still, the second shaft is rotationally fixedly connectable by a fifth shift element to the housing, and the third shaft is rotationally fixedly connected to the third gear set element of the second planetary gear set and to the first gear set element of the third planetary gear set and is rotationally fixedly connectable by a sixth shift element to the housing.

The transmission according to the invention has the advantage that it is of simple construction, which makes it possible for the transmission to be of small and short construction, such that it is suitable for front-transverse installation. Furthermore, the transmission exhibits low component loads, low transmission losses, good toothing efficiency and a good transmission ratio series. Furthermore, as will be described in detail below, an electric machine can be easily operatively connected to the transmission, such that at least a hybrid traction drive is realizable.

A shaft is to be understood not to exclusively mean, for example, a cylindrical, rotatably mounted machine element for transmitting torques, but to also mean general connecting elements which connect individual components or elements to one another, in particular connecting elements which rotationally fixedly connect multiple elements to one another.

A rotationally fixed connection is understood to mean a connection between two components such that the two components connected to one another always have the same rotational speed. This is not the case if, for example, a shift element is situated between the two components connected to one another, which shift element is in the open state. The rotationally fixed connection may be realized for example by a spline toothing.

The housing may be a transmission housing, which is static during operation of the transmission. This means that the transmission housing does not rotate during operation. The three planetary gear sets may be arranged in a cavity of the transmission housing.

In one particular embodiment, the fifth and sixth shift elements may be brakes. The first, second, third and fourth shift elements may be clutches. As a result, a transmission of simple construction with three planetary gear sets, four clutches and two shift elements are providable. Here, the fifth and sixth shift elements may be positively locking shift elements, such as for example a dog or synchronizing means.

In one particular embodiment, the first gear set element of the first planetary gear set may be rotationally fixedly connected to the housing. The second gear set element of the first planetary gear set may be rotationally fixedly connected to the drive shaft, and the third gear set element of the first planetary gear set may be rotationally fixedly connectable by the third shift element to the first shaft and by the fourth shift element to the third shaft. This means that, in this embodiment, the first gear set element corresponds to one of the three gear set elements of the first planetary gear set, the second gear set element corresponds to another of the three gear set elements of the first planetary gear set, and the third gear set element corresponds to a further one of the three gear set elements of the first planetary gear set.

Alternative embodiments are also possible in which the coupling of the three gear set elements to the housing, to the drive shaft and to the third and fourth shift elements is realized in some other way. In these embodiments, it must however be ensured that the further gear set element coupled to the third and fourth shift elements has a higher rotational speed than the drive shaft.

In a particular embodiment, the first shift element and the second shift element may be arranged relative to one another such that a first radial plane has the first shift element and the second shift element. A construction of the transmission which is compact in an axial direction is thus possible. This is advantageous in particular in the case of the transmission being installed in a front-transverse direction, because in the case of this arrangement, there is little structural space available for the transmission. A radial plane is understood to mean a plane which extends in a radial direction in relation to a central axis of the transmission and is arranged normal to the central axis.

Furthermore, the second planetary gear set and the third planetary gear set may be arranged relative to one another such that a second radial plane has the gear set elements of the second planetary gear set and the gear set elements of the third planetary gear set. In particular, the second radial plane may have the first, the second and the third gear set element of the second planetary gear set and the first, the second and the third gear set element of the third planetary gear set. In this way, the transmission is compact in an axial direction with respect to the central axis of the transmission is possible.

The first planetary gear set, the second planetary gear set and the third planetary gear set may be arranged coaxially with respect to the central axis. Here, the third planetary gear set is arranged radially outside of the second planetary gear set with respect to the central axis, and/or the third planetary gear set surrounds the second planetary gear set at least in sections. Here, the gear set elements of the second planetary gear set are surrounded at least in sections by the third planetary gear set.

The third shift element and/or the fourth shift element may be arranged radially outside of the first planetary gear set with respect to the central axis. Here, the third shift element and/or the fourth shift element may fully surround the first planetary gear set.

Furthermore, the sixth shift element may be arranged radially outside of the third shift element and/or the fourth shift element with respect to the central axis of the transmission. The sixth shift element may fully surround the third shift element and/or the fourth shift element. As a result, a compact transmission is realizable by the abovementioned arrangement and/or design of the first planetary gear set and/or of the third, fourth and/or sixth shift elements.

The first planetary gear set may be a minus planetary gear set. In this case, the first gear set element is a sun gear, the second gear set element is a carrier and the third gear set element is a ring gear. Alternatively, the first planetary gear set may be a plus planetary gear set. In this case, the first gear set element is a sun gear, the second gear set element is a ring gear and the third gear set element is a carrier.

A minus planetary gear set corresponds to a planetary gear set having a carrier, on which the planet gears are rotatably mounted, having a sun gear and having a ring gear, wherein the toothing of at least one of the planet gears meshes both with the toothing of the sun gear and with the toothing of the ring gear, whereby the ring gear and the sun gear rotate in opposite directions if the sun gear rotates when the carrier is fixed.

By contrast to this, a plus planetary gear set differs from the minus planetary gear set in that the plus planetary gear set has inner and outer planet gears which are rotatably mounted on the carrier. Here, the toothing of the inner planet gears meshes at one side with the toothing of the sun gear and at the other side with the toothing of the outer planet gears. The toothing of the outer planet gears furthermore meshes with the toothing of the ring gear. This has the result that, when the carrier is fixed, the ring gear and the sun gear rotate in the same direction of rotation.

The second planetary gear set may be a minus planetary gear set. In this case, the first gear set element may be a sun gear, the second gear set element may be a carrier and the third gear set element may be a ring gear. The second planetary gear set may alternatively be a plus planetary gear set, wherein the first gear set element is a sun gear, the second gear set element is a ring gear and the third gear set element is a carrier in this case.

The third planetary gear set may be a minus planetary gear set, wherein the first gear set element is a sun gear, the second gear set element is a carrier and the third gear set element is a ring gear in this case. Alternatively, the third planetary gear set may be a plus planetary gear set. In this case, the first gear set element is a sun gear, the second gear set is a ring gear and the third gear set element is a carrier.

The output shaft may extend transversely, in particular perpendicularly, with respect to the drive shaft. In this way, a transmission is provided which is particularly well suited to front-transverse installation in a motor vehicle. The transmission may have, at one side, an interface to a motor vehicle drive unit external to the transmission, such as, for example, an internal combustion engine. Here, the first planetary gear set may be arranged closer to the interface, and thus to the motor vehicle drive unit, than the second and/or third planetary gear set. Alternatively, the second and/or third planetary gear set may be arranged closer to the interface, and thus to the motor vehicle drive unit, than the first planetary gear set. As a result, it is possible to react in a flexible manner to the structural space conditions of the vehicle. The second and third planetary gear sets, which extend radially further than the first planetary gear set, can thus be arranged closer to or further away from the drive shaft than the first planetary gear set in a manner dependent on the available structural space.

The transmission may be a multi-ratio transmission by which at least eight gear ratios, in particular exactly eight gear ratios, for forward traction operation of the motor vehicle are realizable. Furthermore, at least one, in particular exactly two, reverse gear ratios for reverse traction operation of the motor vehicle and at least one, in particular exactly one, intermediate gear ratio is realizable by the transmission.

In particular, the following gear ratios between the drive shaft and the output shaft are realizable by selective closure of two of the six shift elements:

A first gear ratio is realizable by closing the first shift element and the sixth shift element of the six shift elements, wherein the remaining shift elements of the six shift elements are open. A second gear ratio is realizable by closing the third shift element and the sixth shift element of the six shift elements, wherein the remaining shift elements of the six shift elements are open. Furthermore, a third gear ratio is realizable by closing the second shift element and the sixth shift element of the six shift elements, wherein the remaining shift elements of the six shift elements are open. A fourth gear ratio is realizable by closing the second shift element and the third shift element of the six shift elements, wherein the remaining shift elements of the six shift elements are open. By contrast, a fifth gear ratio is realizable by closing the first shift element and the second shift element of the six shift elements, wherein the remaining shift elements of the six shift elements are open. A sixth gear ratio is realizable by closing the second shift element and the fourth shift element of the six shift elements, wherein the remaining shift elements of the six shift elements are open. Furthermore, a seventh gear ratio is realizable by closing the first shift element and the fourth shift element of the six shift elements, wherein the remaining shift elements of the six shift elements are open. An eighth gear ratio is realizable by closing the third shift element and the fourth shift element of the six shift elements, wherein the remaining shift elements of the six shift elements are open.

Through the transmission, it is furthermore possible for a first reverse gear ratio to be realized by closing the first shift element and the fifth shift element of the six shift elements, wherein the remaining shift elements of the six shift elements are open. A second reverse gear ratio is realizable by closing the third shift element and the fifth shift element of the six shift elements, wherein the remaining shift elements of the six shift elements are open. An intermediate gear ratio is realizable by closing the fourth shift element and the fifth shift element of the six shift elements, wherein the remaining shift elements of the six shift elements are open.

To realize a transmission which has the abovementioned gear ratios, the transmission may have at least three planetary gear sets, in particular exactly three planetary gear sets, and at least six shift elements, in particular exactly six shift elements. The gear ratios of the transmission may each be realized by closing exactly two shift elements.

A hybrid transmission having the transmission and the electric machine is particularly advantageous. Here, the electric machine may be operatively connected or operatively connectable to the transmission. Through the provision of the electric machine, purely internal-combustion-engine-powered or hybrid traction operation is possible.

The electric machine is composed at least of a static stator and a rotatably mounted rotor, and is configured to convert electrical energy into mechanical energy in the form of rotational speed and torque in a motor operating mode, and to convert mechanical energy into electrical energy in the form of electrical current and voltage in a generator operating mode. The rotor may be rotationally fixedly connected to a rotor shaft. The electric machine may be arranged in an interior space surrounded by the housing and/or may be rotationally fixedly connected to the housing.

The electric machine may be operatively connectable by a seventh shift element to the output shaft. The seventh shift element may be a clutch. Here, the seventh shift element may serve as a launch element, for example, during purely electric traction operation. Alternatively, at least one, in particular exactly one or exactly two, of the abovementioned six shift elements of the transmission may serve as launch element(s).

The electric machine may be rotationally fixedly connected or rotationally fixedly connectable to the drive shaft. For example, the electric machine may be rotationally fixedly connected directly to the drive shaft by the rotor shaft. Alternatively, the rotor shaft may be rotationally fixedly connectable by the seventh shift element to the rotor shaft.

Alternatively or additionally, the electric machine may be operatively connected or operatively connectable by at least one toothed gear to the drive shaft. For this purpose, the rotor shaft may be rotationally fixedly connected to the toothed gear.

The toothed gear may be in engagement with another toothed gear, which is rotationally fixedly connected to the drive shaft. It is possible for multiple further toothed gears to be provided which are operatively connected to the toothed gear and to the other toothed gear. Here, the toothed gear may be operatively connected to the other toothed gear by the further toothed gears. Here, the seventh shift element may be provided in the drive train between the electric machine and the drive shaft.

Alternatively or additionally, the electric machine may be operatively connected or operatively connectable by a traction mechanism, such as, for example, a chain, to the drive shaft. Here, the seventh shift element may be provided in the drive train between the electric machine and the drive shaft. As a result, the electric machine can be easily operatively connected or operatively connectable to the drive shaft, such that it is ensured that the torque provided by the electric machine is transmittable to the drive shaft.

In one particular embodiment, the hybrid transmission may have an eighth shift element. The eighth shift element serves for operatively connecting the drive shaft to an output shaft of a motor vehicle drive unit, for example, of an internal combustion engine. Through the eighth shift element, the motor vehicle drive unit can be decoupled from the transmission, such that purely electric traction operation is possible.

A motor vehicle having the transmission or the hybrid transmission is particularly advantageous.

BRIEF DESCRIPTION OF THE DRAWINGS

The subject matter of the invention is schematically illustrated in the figures and will be described below. The following is shown.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
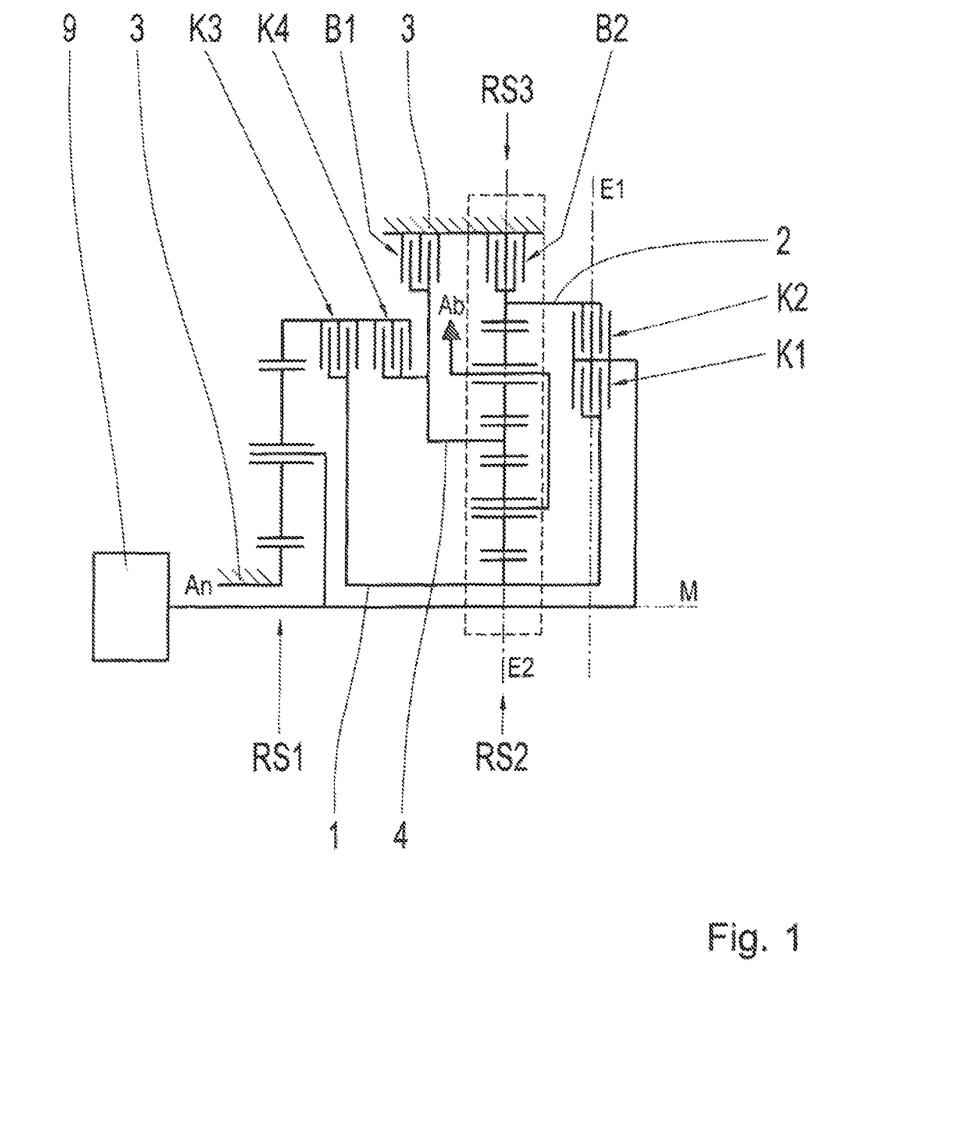
FIG. 1 is a schematic illustration of the transmission according to the invention as per a first exemplary embodiment.

The transmission illustrated in FIG. 1 has a drive shaft An, an output shaft Ab, and three planetary gear sets, specifically a first planetary gear set RS1, a second planetary gear set RS2 and a third planetary gear set RS3. The first, second and third planetary gear sets RS1, RS2, RS3 are minus planetary gear sets. The planetary gear sets are arranged coaxially with respect to a central axis M of the transmission. The transmission shown in FIG. 1 is rotationally symmetrical with respect to the central axis M of the transmission, wherein only the upper part of the transmission is illustrated in FIG. 1.

The transmission furthermore has six shift elements, specifically a first shift element K1, a second shift element K2, a third shift element K3, a fourth shift element K4, a fifth shift element B2 and a sixth shift element B1. Here, the first, second, third and fourth shift elements K1-K4 are clutches and the fifth and sixth shift elements B2, B1 are brakes.

The drive shaft An is rotationally fixedly connectable by the first shift element K1 to a first shaft 1 and by a second shift element K2 to a second shaft 2. A sun gear of the first planetary gear set RS1 is rotationally fixedly connected to a housing 3. The drive shaft An is rotationally fixedly connected to the carrier of the first planetary gear set RS1. The ring gear of the first planetary gear set RS1 is rotationally fixedly connectable by the third shift element K3 to the first shaft 1 and is rotationally fixedly connectable by the fourth shift element K4 to a third shaft 4. Here, the ring gear of the first planetary gear set RS1 has a higher rotational speed than the drive shaft An.

A sun gear of the second planetary gear set RS2 is rotationally fixedly connected to the first shaft 1. A carrier of the second planetary gear set RS2 is rotationally fixedly connected to a carrier of the third planetary gear set RS3. Furthermore, a ring gear of the second planetary gear set RS2 is rotationally fixedly connected to a sun gear of the third planetary gear set RS3. Here, the carrier of the third planetary gear set RS3 is additionally rotationally fixedly connected to the output shaft Ab. The output shaft Ab extends through the third planetary gear set RS3 and is rotationally fixedly connected at one end to the carrier of the second planetary gear set RS2. The ring gear of the third planetary gear set RS3 is rotationally fixedly connected to the second shaft 2.

The second shaft 2 is rotationally fixedly connectable by the fifth shift element B2 to the housing 3, and the third shaft 4 is in each case rotationally fixedly connected to the ring gear of the second planetary gear set RS2 and to the sun gear of the third planetary gear set RS3. Furthermore, the third shaft 4 is rotationally fixedly connectable by the sixth shift element B1 to the housing 3.

The second shift element K2 is situated radially outside of the first shift element K1 with respect to the central axis M. Here, the first shift element K1 and the second shift element K2 are axially arranged with respect to the central axis, such that a first radial plane E1 has the first and second shift elements K1, K2.

The third planetary gear set RS3 is situated radially outside of the second planetary gear set RS2 with respect to the central axis M, wherein the third planetary gear set RS3 surrounds the second planetary gear set RS2. The second and third planetary gear sets RS2, RS3 are arranged axially relative to one another, such that a second radial plane E2 has the second planetary gear set RS2 and the third planetary gear set RS3.

The sixth shift element B1 is arranged radially further away from the central axis M than the third shift element K3 and the fourth shift element K4. The same applies to the fifth shift element B2, which is likewise arranged radially further away from the central axis M than the third and fourth shift elements K3, K4.

The drive shaft An is operatively connected to a motor vehicle drive unit 9, which is for example an internal combustion engine. Here, the first planetary gear set RS1 is arranged closer than the second and third planetary gear sets RS2, RS3 to that end of the drive shaft An which faces toward the motor vehicle drive unit 9. In particular, the first planetary gear set RS1 is arranged axially closer to the motor vehicle drive unit 9 with respect to the central axis M than the second and third planetary gear sets RS2, RS3. Furthermore, the sixth shift element B1 is arranged axially closer to the motor vehicle drive unit 9 than the fifth shift element B2.

Figure 2:
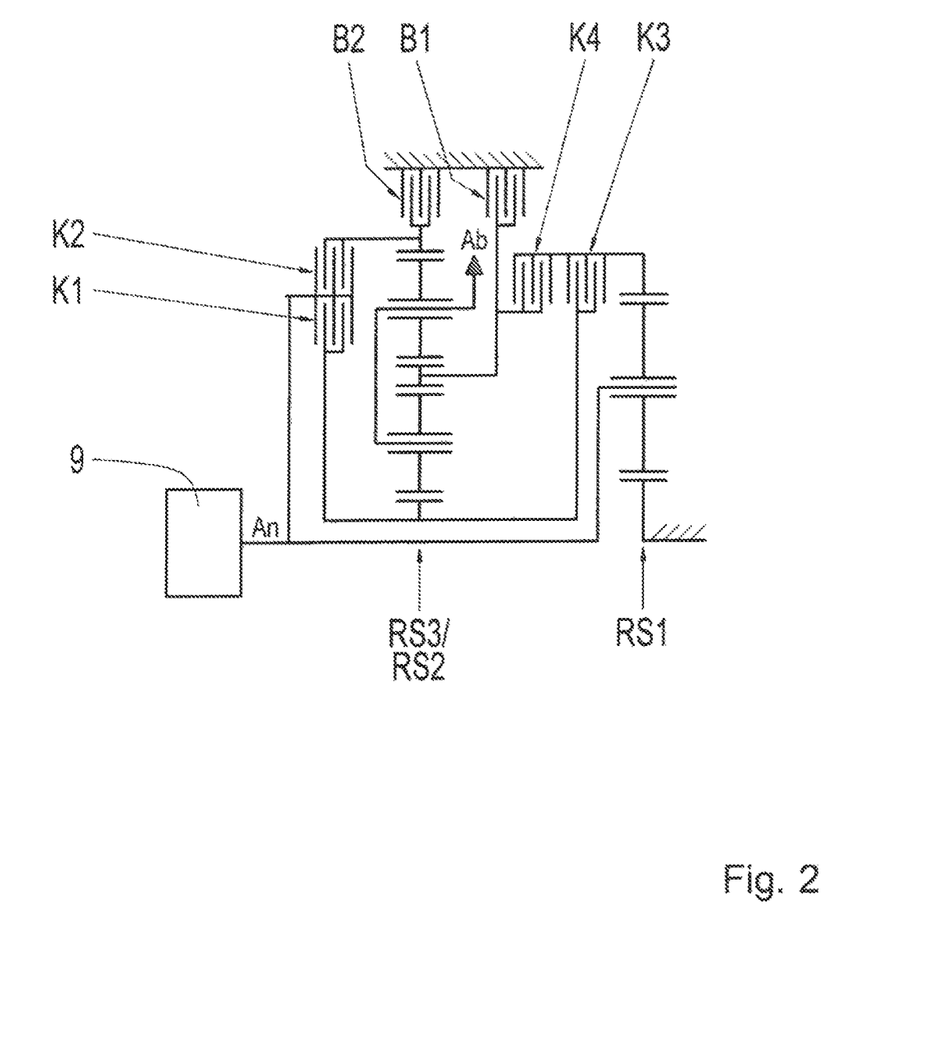
FIG. 2 is a schematic illustration of the transmission according to the invention as per a second exemplary embodiment.

FIG. 2 shows a transmission according to a second exemplary embodiment. The transmission differs from the first exemplary embodiment shown in FIG. 1 in that the second and third planetary gear sets RS2, RS3 are arranged closer to the motor vehicle drive unit 9 than the first planetary gear set RS1. At the same time, the first, second and fifth shift elements K1, K2, B2 are arranged closer to the motor vehicle drive unit 9 than the third, fourth and fifth shift elements K3, K4, B2.

Figure 3:
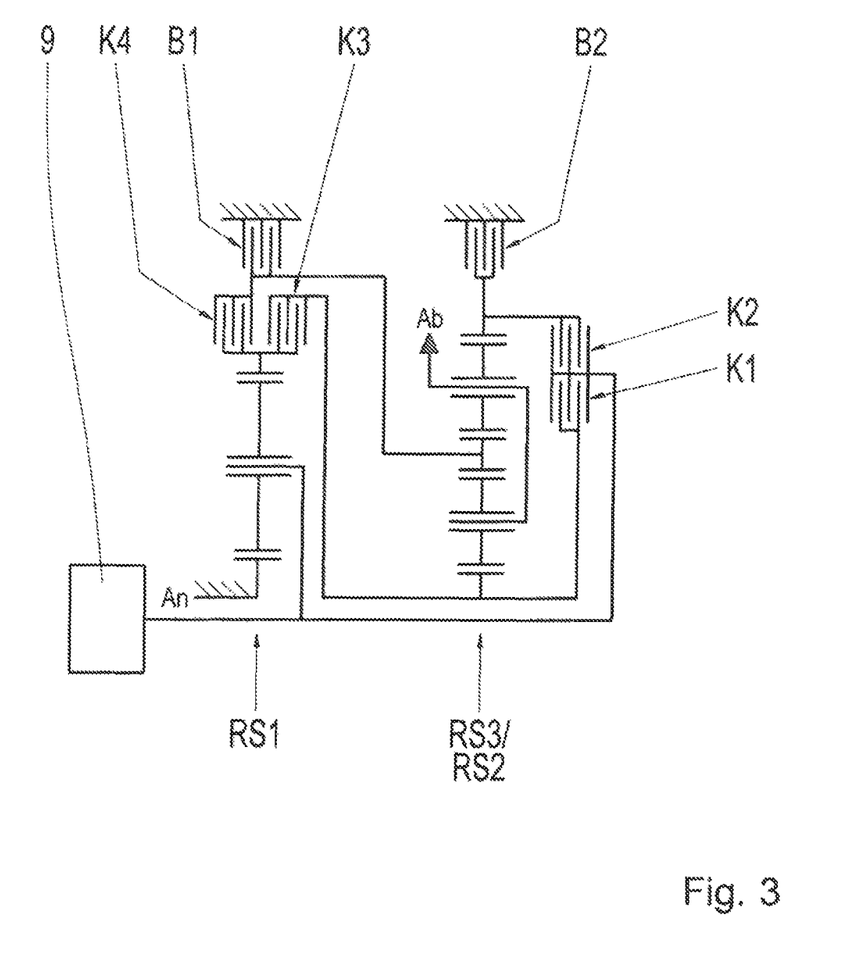
FIG. 3 is a schematic illustration of the transmission according to the invention as per a third exemplary embodiment.

The transmission as per a third exemplary embodiment, as illustrated in FIG. 3, differs from the transmission as per the first exemplary embodiment in terms of the arrangement of the third and fourth shift elements K3, K4. Accordingly, in the exemplary embodiment illustrated in FIG. 3, the third and fourth shift elements K3, K4 are arranged radially outside of the first planetary gear set RS1. This means that the third and fourth shift elements K3, K4 each surround the first planetary gear set RS1.

Figure 4:
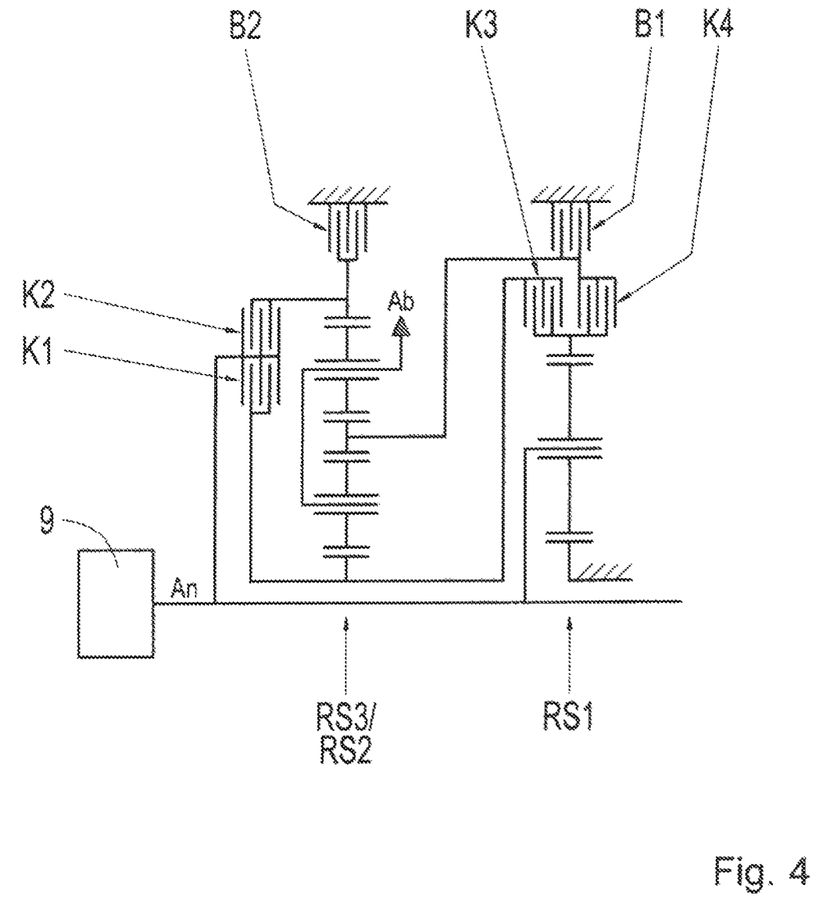
FIG. 4 is a schematic illustration of the transmission according to the invention as per a fourth exemplary embodiment.

FIG. 4 shows the transmission according to a fourth exemplary embodiment. This fourth exemplary embodiment differs from the transmission as per the second exemplary embodiment, as illustrated in FIG. 2, in that the third and fourth shift elements K3, K4 are arranged radially outside of the first planetary gear set RS1, and thus each surround the latter.

Figure 5:
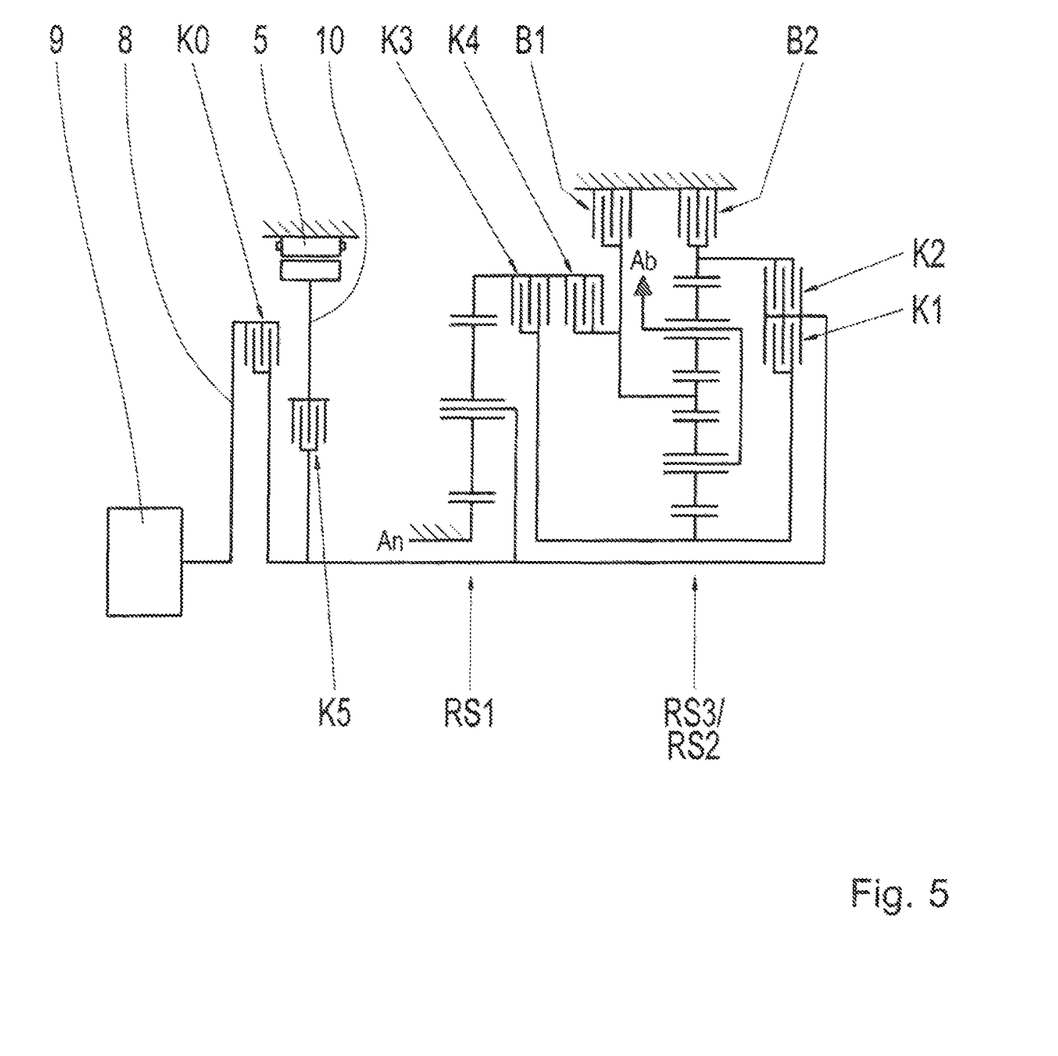
FIG. 5 is a schematic illustration of a hybrid transmission as per a first exemplary embodiment having the transmission according to the invention.

FIG. 5 shows a hybrid transmission as per a first exemplary embodiment. The hybrid transmission differs from the transmission illustrated in FIG. 1 in that, in addition to the transmission shown in FIG. 1, it has an electric machine 5. The electric machine 5 is arranged coaxially with respect to the drive shaft An and is rotationally fixedly connected to a rotor shaft 10. The rotor shaft 10 is rotationally fixedly connectable by a seventh shift element K5 to the drive shaft An. The seventh shift element K5 serves as launch element during a launch by the electric machine 5, and/or is a clutch.

A further difference consists in that the hybrid transmission has an eighth shift element K0. The motor vehicle drive unit 9 is activatable by the eighth shift element K0. In particular, an output shaft 8 of the motor vehicle drive unit 9 is rotationally fixedly connectable by the eighth shift element K0 to the drive shaft An. Through the eighth shift element K0, the motor vehicle drive unit 9 can be decoupled from the hybrid transmission, such that purely electric traction operation is possible. The eighth shift element K0 is a clutch.

Figure 6:
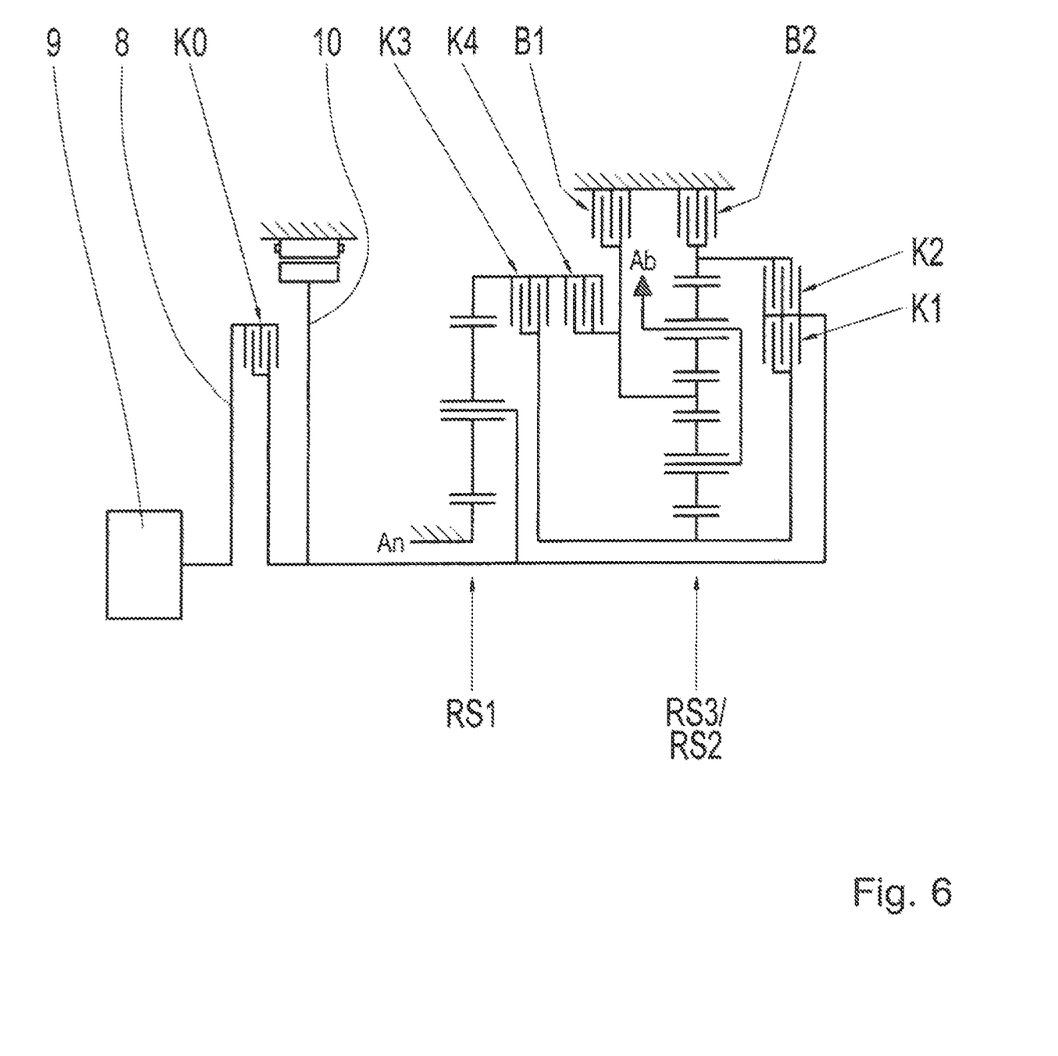
FIG. 6 is a schematic illustration of a hybrid transmission according to the invention as per a second exemplary embodiment having the transmission according to the invention.

FIG. 6 shows a hybrid transmission as per a second exemplary embodiment. The hybrid transmission illustrated in FIG. 6 differs from the hybrid transmission illustrated in FIG. 5 in terms of the coupling of the electric machine 5 to the drive shaft An. The rotor shaft 10 is thus directly rotationally fixedly connected to the drive shaft An.

Figure 7:
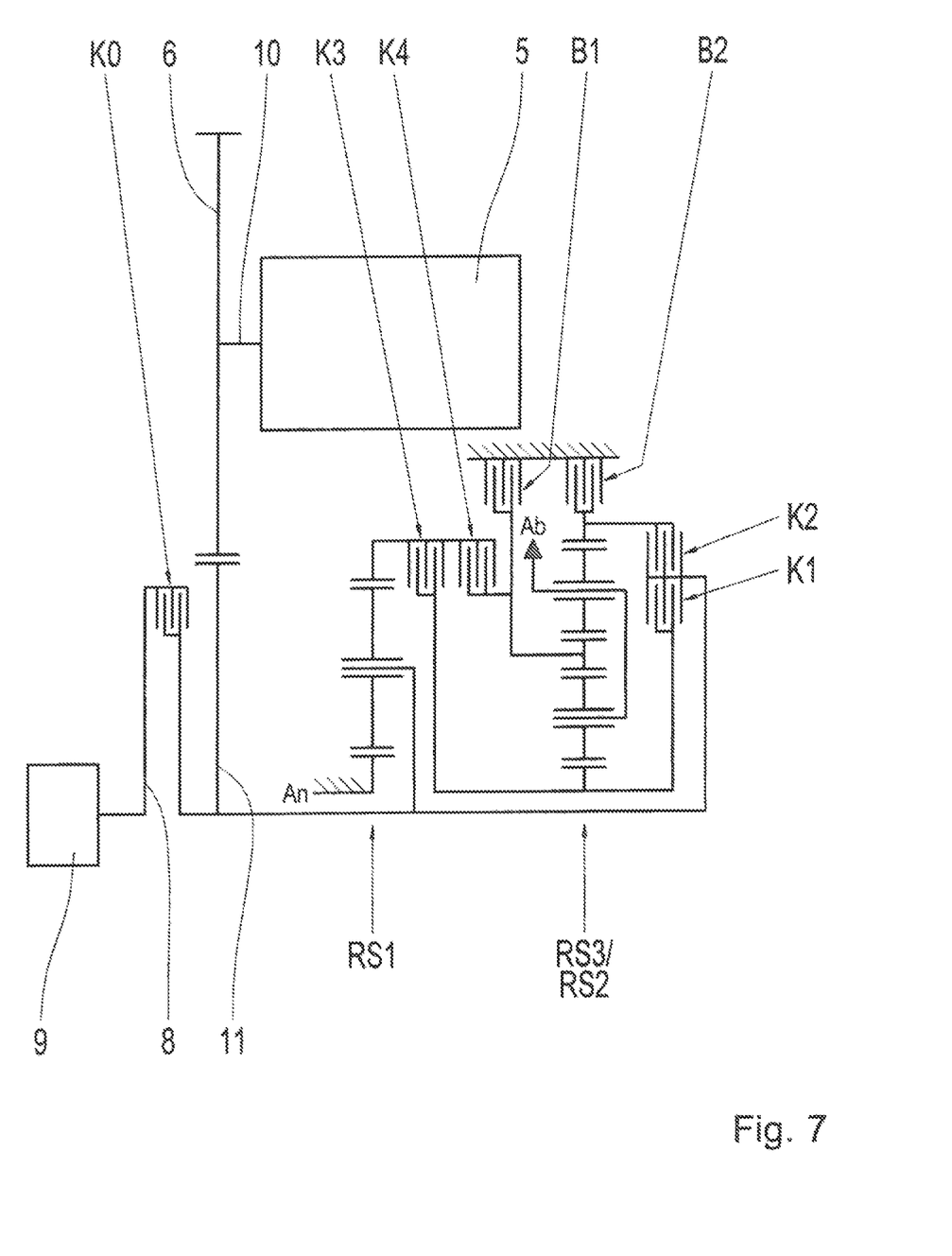
FIG. 7 is a schematic illustration of the hybrid transmission according to the invention as per a third exemplary embodiment having the transmission according to the invention.

The hybrid transmission as per a third exemplary embodiment, as illustrated in FIG. 7, differs from the hybrid transmission illustrated in FIG. 6 in that the rotor shaft 10 is directly rotationally fixedly connected to a toothed gear 6. The toothed gear 6 meshes with another toothed gear 11, which is rotationally fixedly connected to the drive shaft An. A further difference consists in that the electric machine 5 is arranged axially parallel with respect to the drive shaft An and/or to the central axis M.

Figure 8:
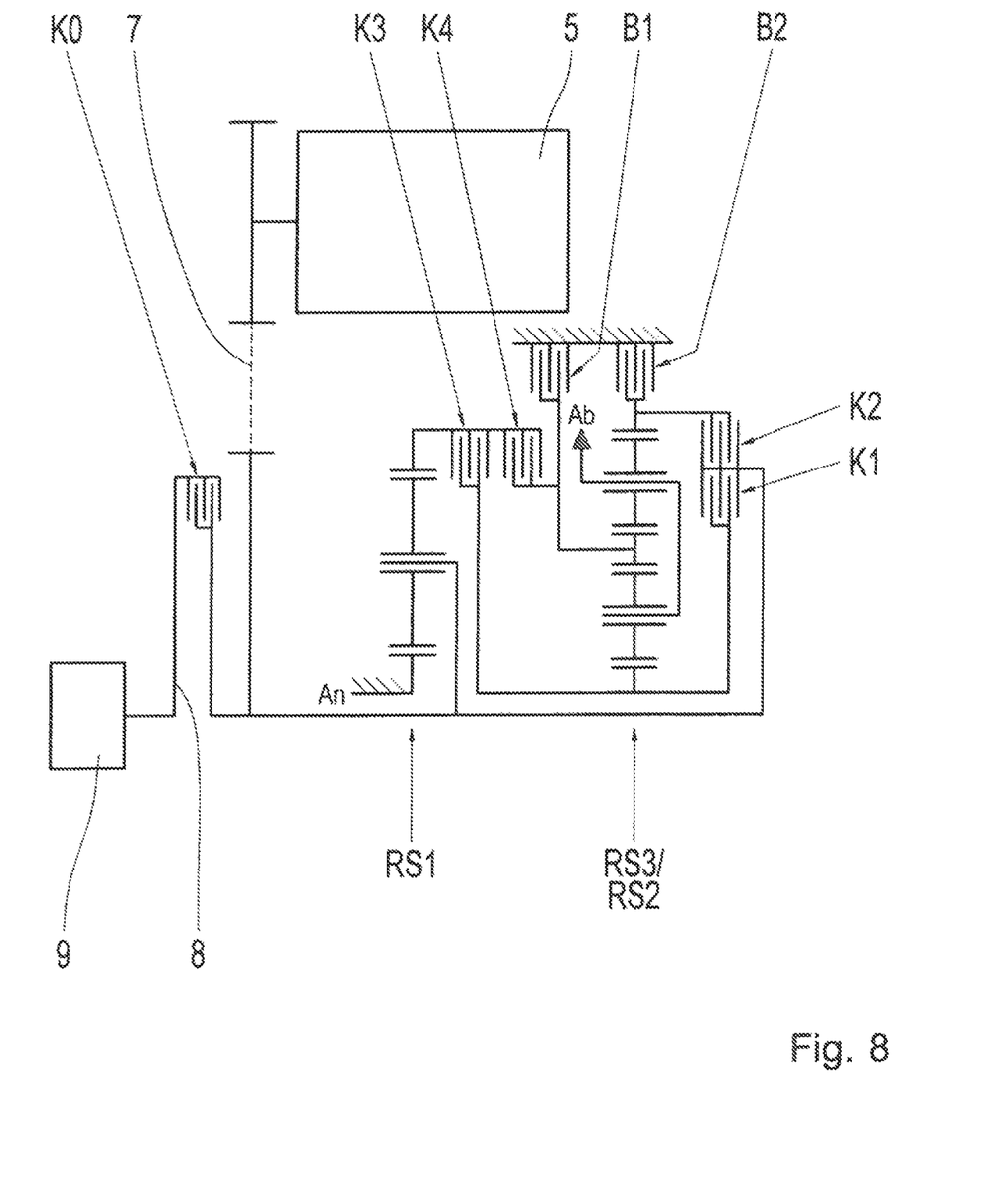
FIG. 8 is a schematic illustration of the hybrid transmission according to the invention as per a fourth exemplary embodiment having the transmission according to the invention.

The hybrid transmission as per a fourth exemplary embodiment, as illustrated in FIG. 8, differs from the hybrid transmission as per a third exemplary embodiment, as illustrated in FIG. 7, in that the electric machine 5 is operatively connected by a traction mechanism drive to the drive shaft An. The traction mechanism drive has a traction mechanism 7, such as, for example, a chain.

Figure 9:
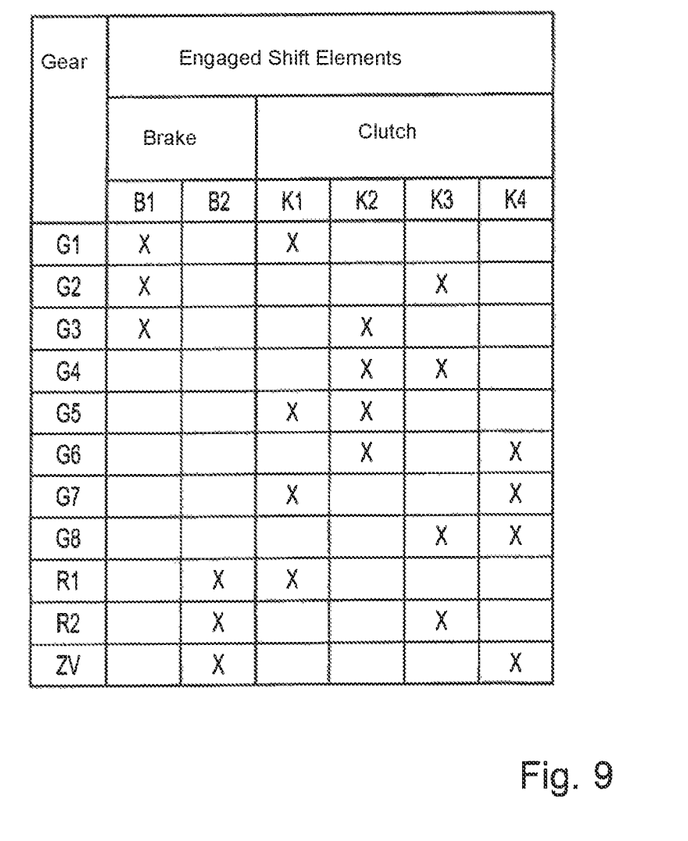
FIG. 9 shows an engagement sequence diagram for the transmission or hybrid transmission illustrated in FIGS. 1 through 8.

FIG. 9 shows an engagement sequence diagram for the transmission or hybrid transmission shown in FIGS. 1 to 8. Here, those shift elements which are closed are denoted by the symbol "X". Those shift elements which are not denoted by the symbol "X" are situated in an open state.

The illustrated transmissions have eight gear ratios G1 to G8 for forward traction operation. Furthermore, the transmission has a first reverse gear ratio R1 and a second reverse gear ratio R2, in each case for reverse traction operation. The transmission furthermore has an intermediate gear ratio ZV.

The individual gear ratios have in common the fact that they are realized by closing exactly two shift elements. All of the abovementioned gear ratios are implementable in purely electric traction operation or in hybrid traction operation or in purely mechanical traction operation.

Modifications and variations can be made to the embodiments illustrated or described herein without departing from the scope and spirit of the invention as set forth in the appended claims.

REFERENCE NUMERALS

1 First shaft
2 Second shaft
3 Housing
4 Third shaft
5 Electric machine
6 Toothed gear
7 Traction mechanism
8 Output shaft
9 Motor vehicle drive unit
10 Rotor shaft
11 Other toothed gear
B1 Sixth shift element
B2 Fifth shift element
G1 First gear ratio
G2 Second gear ratio
G3 Third gear ratio
G4 Fourth gear ratio
G5 Fifth gear ratio
G6 Sixth gear ratio
G7 Seventh gear ratio
G8 Eighth gear ratio
K0 Eighth shift element
K1 First shift element
K2 Second shift element
K3 Third shift element
K4 Fourth shift element
K5 Seventh shift element
M Central axis
An Drive shaft
Ab Output shaft
R1 First reverse gear ratio
R2 Second reverse gear ratio
ZV Intermediate gear ratio
RS1 First planetary gear set
RS2 Second planetary gear set
RS3 Third planetary gear set

The invention claimed is:

1. A transmission, comprising:
a drive shaft (An);
an output shaft (Ab);
first, second and third planetary gear sets (RS1, RS2, RS3);
first, second, third, fourth, fifth and sixth shift elements (K1, K2, K3, K4, B2, B1);
first, second and third shafts (1, 2, 4); and
a housing (3),
wherein the drive shaft (An) is rotationally fixedly connectable by the first shift element (K1) to the first shaft (1) and by the second shift element (K2) to the second shaft (2),
wherein the first planetary gear set (RS1) has first, second and third gear set elements, wherein one of the first, second or third gear set elements is rotationally fixedly connected to the housing (3), another of the first, second or third gear set elements is rotationally fixedly connected to the drive shaft (An), the first planetary gear set (RS1) is configured to provide a rotational speed that is increased in relation to the drive shaft (An) at a further one of the first, second or third gear set elements,
wherein the further one of the first, second or third gear set elements is rotationally fixedly connectable by the third shift element (K3) to the first shaft (1) and is rotationally fixedly connectable by the fourth shift element (K4) to the third shaft (4),
wherein each of the second planetary gear set (RS2) and the third planetary gear set (RS3) has a first gear set element, a second gear set element and a third gear set element, the first gear set element of the second planetary gear set (RS2) is rotationally fixedly connected to the first shaft (1), the second gear set element of the second planetary gear set (RS2) is rotationally fixedly connected to the second gear set element of the third planetary gear set (RS3), and the third gear set element of the second planetary gear set (RS2) is rotationally fixedly connected to the first gear set element of the third planetary gear set (RS3),
wherein the second gear set element of the third planetary gear set (RS3) is rotationally fixedly connected to the output shaft (Ab), and the third gear set element of the third planetary gear set (RS3) is rotationally fixedly connected to the second shaft (2),
wherein the second shaft (2) is rotationally fixedly connectable by the fifth shift element (B2) to the housing (3), and the third shaft (4) is rotationally fixedly connected to the third gear set element of the second planetary gear set (RS2) and to the first gear set element of the third planetary gear set and is rotationally fixedly connectable by the sixth shift element (B1) to the housing (3), and
wherein the first gear set element of the second planetary gear set (RS2) is a sun gear.

2. The transmission of claim 1, wherein:
the first gear set element of the first planetary gear set (RS1) is rotationally fixedly connected to the housing (3);
the second gear set element of the first planetary gear set (RS1) is rotationally fixedly connected to the drive shaft (An); and
the third gear set element of the first planetary gear set (RS1) is rotationally fixedly connectable by the third shift element (K3) to the first shaft (1) and by the fourth shift element (K4) to the third shaft (4).

3. The transmission of claim 1, wherein:
the first shift element (K1) and the second shift element (K2) are positioned within a first radial plane (E1); and/or
the first, second and third gear set elements of the second planetary gear set (RS2) and the first, second and third gear set elements of the third planetary gear set (RS3) are positioned within a second radial plane (E2).

4. The transmission of claim 1, wherein the third shift element (K3) and/or the fourth shift element (K4) are arranged radially outside of the first planetary gear set (RS1).

5. The transmission of claim 1, wherein the sixth shift element (B1) is arranged radially outside of the third shift element (K3) and/or the fourth shift element (K4).

6. The transmission of claim 1, wherein the first planetary gear set (RS1) is a minus planetary gear set, the first gear set element of the first planetary gear set is a sun gear, the second gear set element of the first planetary gear set is a carrier, and the third gear set element of the first planetary gear set is a ring gear.

7. The transmission of claim 1, wherein the first planetary gear set (RS1) is a plus planetary gear set, the first gear set element of the first planetary gear set is a sun gear, the second gear set element of the first planetary gear set is a ring gear, and the third gear set element of the first planetary gear set is a carrier.

8. The transmission of claim 1, wherein the second planetary gear set (RS2) is a minus planetary gear set, the second gear set element of the second planetary gear set is a carrier, and the third gear set element of the second planetary gear set is a ring gear.

9. The transmission of claim 1, wherein the second planetary gear set (RS2) is a plus planetary gear set, the second gear set element of the second planetary gear set is a ring gear, and the third gear set element of the second planetary gear set is a carrier.

10. The transmission of claim 1, wherein the third planetary gear set (RS3) is a minus planetary gear set, the first gear set element of the third planetary gear set is a sun gear, the second gear set element of the third planetary gear set is a carrier, and the third gear set element of the third planetary gear set is a ring gear.

11. The transmission of claim 1, wherein the third planetary gear set (RS3) is a plus planetary gear set, the first gear set element of the third planetary gear set is a sun gear, the second gear set element of the third planetary gear set is a ring gear, and the third gear set element of the third planetary gear set is a carrier.

12. The transmission of claim 1, wherein:
a first gear ratio (G1) is selectively realizable by closing the first shift element (K1) and the sixth shift element (B1) with the remaining shift elements being open;
a second gear ratio (G2) is selectively realizable by closing the third shift element (K3) and the sixth shift element (B1) with the remaining shift elements being open;
a third gear ratio (G3) is selectively realizable by closing the second shift element (K2) and the sixth shift element (B1) with the remaining shift elements being open;
a fourth gear ratio (G4) is selectively realizable by closing the second shift element (K2) and the third shift element (K3) with the remaining shift elements being open;
a fifth gear ratio (G5) is selectively realizable by closing the first shift element (K1) and the second shift element (K2) with the remaining shift elements being open;
a sixth gear ratio (G6) is selectively realizable by closing the second shift element (K2) and the fourth shift element (K4) with the remaining shift elements being open;
a seventh gear ratio (G7) is selectively realizable by closing the first shift element (K1) and the fourth shift element (K4) with the remaining shift elements being open;
an eighth gear ratio (G8) is selectively realizable by closing the third shift element (K3) and the fourth shift element (K4) with the remaining shift elements being open;
a first reverse gear ratio (R1) is selectively realizable by closing the first shift element (K1) and the fifth shift element (B2) with the remaining shift elements being open;
a second reverse gear ratio (R2) is selectively realizable by closing the third shift element (K3) and the fifth shift element (B2) with the remaining shift elements being open; and
an intermediate gear ratio (ZV) is selectively realizable by closing the fourth shift element (K4) and the fifth shift element (B2) with the remaining shift elements being open.

13. The transmission of claim 1, wherein the transmission has, at one side, an interface to a motor vehicle drive unit (9) external to the transmission, the first planetary gear set (RS1) positioned closer to the interface than the second planetary gear set (RS2) and/or the third planetary gear set (RS3).

14. The transmission of claim 1, wherein the transmission has, at one side, an interface to a motor vehicle drive unit (9) external to the transmission, the second planetary gear set (RS2) and/or the third planetary gear set (RS3) positioned closer to the interface than the first planetary gear set (RS1).

15. A hybrid transmission having a transmission according to claim 1 and an electric machine (5), wherein the electric machine (5) is operatively connected or operatively connectable to the transmission.

16. The hybrid transmission of claim 15, wherein the electric machine (5) is operatively connectable by a seventh shift element (K5) to the drive shaft (An).

17. The hybrid transmission of claim 15, wherein the electric machine (5) is rotationally fixedly connected or connectable to the drive shaft (An) or is operatively connected or operatively connectable to the drive shaft (An) by at least one toothed gear (6) or by a traction mechanism (7).

18. The hybrid transmission of claim 15, further comprising an additional shift element (K0) for operatively connecting the drive shaft (An) to an output shaft (8) of a motor vehicle drive unit.

19. A vehicle having a transmission according to claim 1.

20. A vehicle having a hybrid transmission according to claim 15.

21. A transmission, comprising:
a drive shaft (An);
an output shaft (Ab);
first, second and third planetary gear sets (RS1, RS2, RS3);
first, second, third, fourth, fifth and sixth shift elements (K1, K2, K3, K4, B2, B1);
first, second and third shafts (1, 2, 4); and
a housing (3),
wherein the drive shaft (An) is rotationally fixedly connectable by the first shift element (K1) to the first shaft (1) and by the second shift element (K2) to the second shaft (2),
wherein the first planetary gear set (RS1) has first, second and third gear set elements, wherein one of the first, second or third gear set elements is rotationally fixedly connected to the housing (3), another of the first, second or third gear set elements is rotationally fixedly connected to the drive shaft (An), the first planetary gear set (RS1) is configured to provide a rotational speed that is increased in relation to the drive shaft (An) at a further one of the first, second or third gear set elements, wherein the further one of the first, second or third gear set elements is rotationally fixedly connectable by the third shift element (K3) to the first shaft (1) and is rotationally fixedly connectable by the fourth shift element (K4) to the third shaft (4), wherein each of the second planetary gear set (RS2) and the third planetary gear set (RS3) has a first gear set element, a second gear set element and a third gear set element, the first gear set element of the second planetary gear set (RS2) is rotationally fixedly connected to the first shaft (1), the second gear set element of the second planetary gear set (RS2) is rotationally fixedly connected to the second gear set element of the third planetary gear set (RS3), and the third gear set element of the second planetary gear set (RS2) is rotationally fixedly connected to the first gear set element of the third planetary gear set (RS3), wherein the second gear set element of the third planetary gear set (RS3) is rotationally fixedly connected to the output shaft (Ab), and the third gear set element of the third planetary gear set (RS3) is rotationally fixedly connected to the second shaft (2), wherein the second shaft (2) is rotationally fixedly connectable by the fifth shift element (B2) to the housing (3), and the third shaft (4) is rotationally fixedly connected to the third gear set element of the second planetary gear set (RS2) and to the first gear set element of the third planetary gear set and is rotationally fixedly connectable by the sixth shift element (B1) to the housing (3), and wherein the first shift element (K1) and the second shift element (K2) are positioned within a first radial plane (E1).

22. A transmission, comprising:
a drive shaft (An);
an output shaft (Ab);
first, second and third planetary gear sets (RS1, RS2, RS3);
first, second, third, fourth, fifth and sixth shift elements (K1, K2, K3, K4, B2, B1);
first, second and third shafts (1, 2, 4); and
a housing (3), wherein the drive shaft (An) is rotationally fixedly connectable by the first shift element (K1) to the first shaft (1) and by the second shift element (K2) to the second shaft (2), wherein the first planetary gear set (RS1) has first, second and third gear set elements, wherein one of the first, second or third gear set elements is rotationally fixedly connected to the housing (3), another of the first, second or third gear set elements is rotationally fixedly connected to the drive shaft (An), the first planetary gear set (RS1) is configured to provide a rotational speed that is increased in relation to the drive shaft (An) at a further one of the first, second or third gear set elements, wherein the further one of the first, second or third gear set elements is rotationally fixedly connectable by the third shift element (K3) to the first shaft (1) and is rotationally fixedly connectable by the fourth shift element (K4) to the third shaft (4), wherein each of the second planetary gear set (RS2) and the third planetary gear set (RS3) has a first gear set element, a second gear set element and a third gear set element, the first gear set element of the second planetary gear set (RS2) is rotationally fixedly connected to the first shaft (1), the second gear set element of the second planetary gear set (RS2) is rotationally fixedly connected to the second gear set element of the third planetary gear set (RS3), and the third gear set element of the second planetary gear set (RS2) is rotationally fixedly connected to the first gear set element of the third planetary gear set (RS3), wherein the second gear set element of the third planetary gear set (RS3) is rotationally fixedly connected to the output shaft (Ab), and the third gear set element of the third planetary gear set (RS3) is rotationally fixedly connected to the second shaft (2), wherein the second shaft (2) is rotationally fixedly connectable by the fifth shift element (B2) to the housing (3), and the third shaft (4) is rotationally fixedly connected to the third gear set element of the second planetary gear set (RS2) and to the first gear set element of the third planetary gear set and is rotationally fixedly connectable by the sixth shift element (B1) to the housing (3), and the first, second and third gear set elements of the second planetary gear set (RS2) and the first, second and third gear set elements of the third planetary gear set (RS3) are positioned within a second radial plane (E2).

23. A transmission, comprising:
a drive shaft (An);
an output shaft (Ab);
first, second and third planetary gear sets (RS1, RS2, RS3);
first, second, third, fourth, fifth and sixth shift elements (K1, K2, K3, K4, B2, B1);
first, second and third shafts (1, 2, 4); and
a housing (3), wherein the drive shaft (An) is rotationally fixedly connectable by the first shift element (K1) to the first shaft (1) and by the second shift element (K2) to the second shaft (2), wherein the first planetary gear set (RS1) has first, second and third gear set elements, wherein one of the first, second or third gear set elements is rotationally fixedly connected to the housing (3), another of the first, second or third gear set elements is rotationally fixedly connected to the drive shaft (An), the first planetary gear set (RS1) is configured to provide a rotational speed that is increased in relation to the drive shaft (An) at a further one of the first, second or third gear set elements, wherein the further one of the first, second or third gear set elements is rotationally fixedly connectable by the third shift element (K3) to the first shaft (1) and is rotationally fixedly connectable by the fourth shift element (K4) to the third shaft (4), wherein each of the second planetary gear set (RS2) and the third planetary gear set (RS3) has a first gear set element, a second gear set element and a third gear set element, the first gear set element of the second planetary gear set (RS2) is rotationally fixedly connected to the first shaft (1), the second gear set element of the second planetary gear set (RS2) is rotationally fixedly connected to the second gear set element of the third planetary gear set (RS3), and the third gear set element of the second planetary gear set (RS2) is rotationally fixedly connected to the first gear set element of the third planetary gear set (RS3), wherein the second gear set element of the third planetary gear set (RS3) is rotationally fixedly connected to the output shaft (Ab), and the third gear set element of the third planetary gear set (RS3) is rotationally fixedly connected to the second shaft (2), wherein the second shaft (2) is rotationally fixedly connectable by the fifth shift element (B2) to the housing (3), and the third shaft (4) is rotationally fixedly connected to the third gear set element of the second planetary gear set (RS2) and to the first gear set element of the third planetary gear set and is rotationally fixedly connectable by the sixth shift element (B1) to the housing (3), and wherein the transmission has, at one side, an interface to a motor vehicle drive unit (9) external to the transmission, the second planetary gear set (RS2) and/or the third planetary gear set (RS3) positioned closer to the interface than the first planetary gear set (RS1).

24. A hybrid transmission, comprising:
a drive shaft (An);
an output shaft (Ab);
first, second and third planetary gear sets (RS1, RS2, RS3);
first, second, third, fourth, fifth and sixth shift elements (K1, K2, K3, K4, B2, B1);
first, second and third shafts (1, 2, 4);
a housing (3); and
an electric machine (5), wherein the drive shaft (An) is rotationally fixedly connectable by the first shift element (K1) to the first shaft (1) and by the second shift element (K2) to the second shaft (2), wherein the first planetary gear set (RS1) has first, second and third gear set elements, wherein one of the first, second or third gear set elements is rotationally fixedly connected to the housing (3), another of the first, second or third gear set elements is rotationally fixedly connected to the drive shaft (An), the first planetary gear set (RS1) is configured to provide a rotational speed that is increased in relation to the drive shaft (An) at a further one of the first, second or third gear set elements, wherein the further one of the first, second or third gear set elements is rotationally fixedly connectable by the third shift element (K3) to the first shaft (1) and is rotationally fixedly connectable by the fourth shift element (K4) to the third shaft (4), wherein each of the second planetary gear set (RS2) and the third planetary gear set (RS3) has a first gear set element, a second gear set element and a third gear set element, the first gear set element of the second planetary gear set (RS2) is rotationally fixedly connected to the first shaft (1), the second gear set element of the second planetary gear set (RS2) is rotationally fixedly connected to the second gear set element of the third planetary gear set (RS3), and the third gear set element of the second planetary gear set (RS2) is rotationally fixedly connected to the first gear set element of the third planetary gear set (RS3), wherein the second gear set element of the third planetary gear set (RS3) is rotationally fixedly connected to the output shaft (Ab), and the third gear set element of the third planetary gear set (RS3) is rotationally fixedly connected to the second shaft (2), wherein the second shaft (2) is rotationally fixedly connectable by the fifth shift element (B2) to the housing (3), and the third shaft (4) is rotationally fixedly connected to the third gear set element of the second planetary gear set (RS2) and to the first gear set element of the third planetary gear set and is rotationally fixedly connectable by the sixth shift element (B1) to the housing (3), and wherein the electric machine (5) is operatively connectable by a seventh shift element (K5) to the drive shaft (An).

* * * * *